United States Patent
Sato et al.

(10) Patent No.: US 11,175,387 B2
(45) Date of Patent: Nov. 16, 2021

(54) OPTICAL SENSOR AND ELECTRONIC DEVICE

(71) Applicant: SHARP KABUSHIKI KAISHA, Sakai (JP)

(72) Inventors: Hideki Sato, Sakai (JP); Yoshiki Ikuta, Sakai (JP); Takayuki Shimizu, Sakai (JP); Takuma Hiramatsu, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 438 days.

(21) Appl. No.: 16/328,531

(22) PCT Filed: Jun. 9, 2017

(86) PCT No.: PCT/JP2017/021465
§ 371 (c)(1),
(2) Date: Feb. 26, 2019

(87) PCT Pub. No.: WO2018/047429
PCT Pub. Date: Mar. 15, 2018

(65) Prior Publication Data
US 2019/0195993 A1    Jun. 27, 2019

(30) Foreign Application Priority Data

Sep. 8, 2016  (JP) .............................. JP2016-175762

(51) Int. Cl.
*G01S 7/4865* (2020.01)
*G01S 17/10* (2020.01)
(Continued)

(52) U.S. Cl.
CPC .............. *G01S 7/4865* (2013.01); *G01C 3/06* (2013.01); *G01J 1/42* (2013.01); *G01J 1/44* (2013.01);
(Continued)

(58) Field of Classification Search
CPC ........ G01S 7/4865; G01S 7/486; G01S 17/10; G01J 1/42; G01J 1/44; G01J 2001/442; G01C 3/06
See application file for complete search history.

(56) References Cited

U.S. PATENT DOCUMENTS 6,208,701 B1    3/2001 Hiramatsu et al.
2002/0093640 A1    7/2002 Watanabe et al.
(Continued)

FOREIGN PATENT DOCUMENTS

JP    H10-215289 A    8/1998
JP    H11-237473 A    8/1999
(Continued)

*Primary Examiner* — Thanh Luu
*Assistant Examiner* — Monica T Taba
(74) *Attorney, Agent, or Firm* — ScienBiziP, P.C.

(57) ABSTRACT

An optical sensor configured to reduce a measurement time while the accuracy of the optical sensor is maintained is realized. An initial configuration circuit (19) includes a counter configured to perform counting of the number of pulse outputs from a first light-receiving unit (11) in first to nth regions obtained by dividing each cycle of a reference clock into n equal parts, determines, among the first to nth regions, a region in which a counter value is largest, and the initial configuration circuit causes a first DLL circuit (17) to perform a converging operation to the region determined.

8 Claims, 13 Drawing Sheets

(51) Int. Cl.
    *G01J 1/44*          (2006.01)
    *G01J 1/42*          (2006.01)
    *G01C 3/06*         (2006.01)
    *G01S 7/486*        (2020.01)

(52) U.S. Cl.
    CPC .............. *G01S 7/486* (2013.01); *G01S 17/10* (2013.01); *G01J 2001/442* (2013.01)

(56) References Cited

U.S. PATENT DOCUMENTS

| | | |
|---|---|---|
| 2012/0075615 A1 | 3/2012 | Niclass et al. |
| 2013/0077082 A1 | 3/2013 | Mellot |
| 2013/0153754 A1 | 6/2013 | Drader et al. |
| 2014/0231631 A1 | 8/2014 | Moore et al. |
| 2015/0041625 A1* | 2/2015 | Dutton .................... G01S 17/10 250/208.1 |
| 2016/0047904 A1 | 2/2016 | Mellot |
| 2016/0291316 A1* | 10/2016 | Mellot .................. G01S 7/4865 |

FOREIGN PATENT DOCUMENTS

| | | |
|---|---|---|
| JP | 2001-108747 A | 4/2001 |
| JP | 2002-214369 A | 7/2002 |
| JP | 2005-051466 A | 2/2005 |
| JP | 2006-329902 A | 12/2006 |
| JP | 2009-218744 A | 9/2009 |
| JP | 2012-530917 A | 12/2012 |
| JP | 2015-155872 A | 8/2015 |

* cited by examiner

OPTICAL SENSOR AND ELECTRONIC DEVICE

TECHNICAL FIELD

The present invention relates to an optical sensor and an electronic device in which the optical sensor is built.

BACKGROUND ART

For optical communication and/or time-of-flight (TOF) measurement, an avalanche photodiode using an avalanche amplification effect of a photodiode has been adopted as a light-receiving element for detecting faint light at high speed. When a reverse bias voltage lower than a breakdown voltage is applied to the avalanche photodiode, the avalanche photodiode operates in a linear mode and changes its output current to be positively correlated with a received light amount. In contrast, when a reverse bias voltage higher than or equal to the breakdown voltage is applied to the avalanche photodiode, the avalanche photodiode operates in a Geiger mode. The avalanche photodiode in the Geiger mode causes an avalanche phenomenon even with incidence of a single photon, and thus, a large output current is obtained. Therefore, the avalanche photodiode in the Geiger mode is referred to as a Single Photon Avalanche Diode (SPAD).

To the avalanche photodiode in the Geiger mode, a quenching resistor is added in series, thereby enabling a pulse output synchronous with photon incidence to be obtained. Such a circuit includes, as illustrated in FIG. 14, a photodiode PD14, an active quenching resistor R14 (resistor component of a MOS transistor), and a buffer BUF14. Here, the photodiode PD14 is an avalanche photodiode in a Geiger mode. When a bias voltage higher than or equal to a breakdown voltage is applied to the photodiode PD14, an avalanche phenomenon occurs in response to incidence of a single photon to cause a current to flow. The current then flows to the active quenching resistor R14 connected in series to the photodiode PD14 to increase a voltage between terminals of the active quenching resistor R14, and accordingly, the bias voltage across the photodiode PD14 decreases, thereby stopping the avalanche phenomenon. When the current caused by the avalanche phenomenon disappears, the voltage between the terminals of the active quenching resistor R14 decreases, and therefore, the photodiode PD14 returns to a state where the bias voltage higher than or equal to the breakdown voltage is applied thereto. The buffer BUF14 takes out a voltage variation between the photodiode PD14 and the active quenching resistor R14 as a pulse output synchronous with the photon incidence.

PTL 1 discloses a distance measurement method which adopts the single photon avalanche diode (SPAD) to input each of reflected light and direct light from a light emitting device to a corresponding one of two Delay Locked Loop circuits (DLL circuits) and to convert a phase delay amount between output pulses of the two DLL circuits into a digital value.

PTL 2 discloses a distance measurement method in which a sensor in a time-of-flight (TOF) measurement system realizes distance measurement at high speed and with high accuracy.

CITATION LIST

Patent Literature

PTL 1: United States Patent Application Publication No. 2014/0231631 (publication date: Aug. 21, 2014)

PTL 2: Japanese Patent Application Publication No. 2001-108747 (publication date: Apr. 20, 2001)

SUMMARY OF INVENTION

Technical Problem

In the distance measurement method disclosed in PTL 1, however, the phases of the DLL circuit is caused to converge to an output position of a pulse generated with a delay amount corresponding to the distance to a sensing target on a spatial optical path. Therefore, in order to obtain a highly accurate measurement result, a certain number of pulse outputs have to be obtained from a single photon avalanche diode, but when the sensing target is located in a remote place, or when reflectance is low, the pulse generation ratio of the single photon avalanche diode is low. Thus, in order to obtain a large number of pulses, a long measurement time is required. In contrast, when the measurement time is short and the number of pulses obtained is thus small, the phase may not be able to reach a convergence position and/or a distance value may vary for each measurement, which leads to reduced accuracy.

In the distance measurement method disclosed in PTL 2, a plurality of operation conditions such as a received light amount, a transmitted light amount, and an amplification factor at a transmission timing (a position corresponding to a distance of 0) are stored in memory in advance, only data of a light reception timing (a distance to a sensing target on a spatial optical path) is acquired during measurement, an operation condition at a transmission timing in a similar situation is selected from the memory, and the distance is calculated from the two pieces of data of a light reception timing and the transmission timing selected from the memory.

As described above, since the distance measurement method disclosed in PTL 2 uses results of measurement performed in advance, it is possible to eliminate a delay amount variation of a control signal in a light emitting device and/or a circuit in a short time. However, even when the results in the memory are used, it is not possible to advance determination of the light reception timing (the distance to the sensing target on the spatial optical path). Thus, when the sensing target is located in a remote place, or when reflectance is low, a certain number of pieces of acquisition data are still required for accuracy, and a long measurement time is thus required.

Thus, there are high demands for an optical sensor configured to reduce a measurement time while the accuracy of the optical sensor is maintained.

In view of the foregoing, it is an object of the present invention to provide an optical sensor configured to reduce a measurement time while the accuracy of the optical sensor is maintained.

Solution to Problem

In order to solve the problem, an optical sensor according to one aspect of the present invention includes: a light emitting device; a first light-receiving unit of a photon count-type configured to output a pulse synchronous with photon incidence caused by reflected light from a sensing target; a second light-receiving unit of a photon count-type disposed closer to the light emitting device than the first light-receiving unit is, the second light-receiving unit being configured to output a pulse synchronous with photon incidence caused by reflected light in a sensor package; a time difference extraction circuit including a first DLL circuit configured to receive a pulse output from the first light-receiving unit and a reference clock and a second DLL circuit configured to receive a pulse output from the second light-receiving unit and the reference clock, the time difference extraction circuit being configured to extract a time difference corresponding to a distance on a spatial optical path; and an initial configuration circuit configured to give an initial phase value to the first DLL circuit, wherein the initial configuration circuit includes a means for giving an initial phase value of the first DLL circuit within a region including first to nth regions obtained by dividing each of cycles of the reference clock into n equal parts, where n is an integer larger than or equal to 2, a counter configured to perform counting of the number of pulse outputs from the first light-receiving unit in the first to nth regions, and a comparator for results of the counting, the initial configuration circuit determines by the comparator, a region in which a counter value is largest among the first to nth regions, and the initial configuration circuit gives, as the initial phase value, the region determined to the first DLL circuit to cause the first DLL circuit to perform a converging operation.

The above-described configuration includes the initial configuration circuit which includes the counter. The counter is configured to perform counting of the number of pulse outputs from the first light-receiving unit in the first to nth regions obtained by dividing each cycle of the reference clock into n equal parts, where n is an integer larger than or equal to 2. The initial configuration circuit is configured to determine by the comparator, a region in which a counter value is largest among the first to nth regions and to cause the first DLL circuit to perform a converging operation to the region determined. Thus, the convergence time of the first DLL circuit is advanced in the measurement, and a reduction in the measurement time can be realized while the accuracy is maintained.

Advantageous Effects of Invention

According to an aspect of the present invention, it is possible to realize an optical sensor configured to reduce a measurement time while the accuracy of the optical sensor is maintained.

DESCRIPTION OF EMBODIMENTS

First Embodiment

An embodiment of the present invention will be described in detail below.

Schema of Optical Sensor

Figure 1:
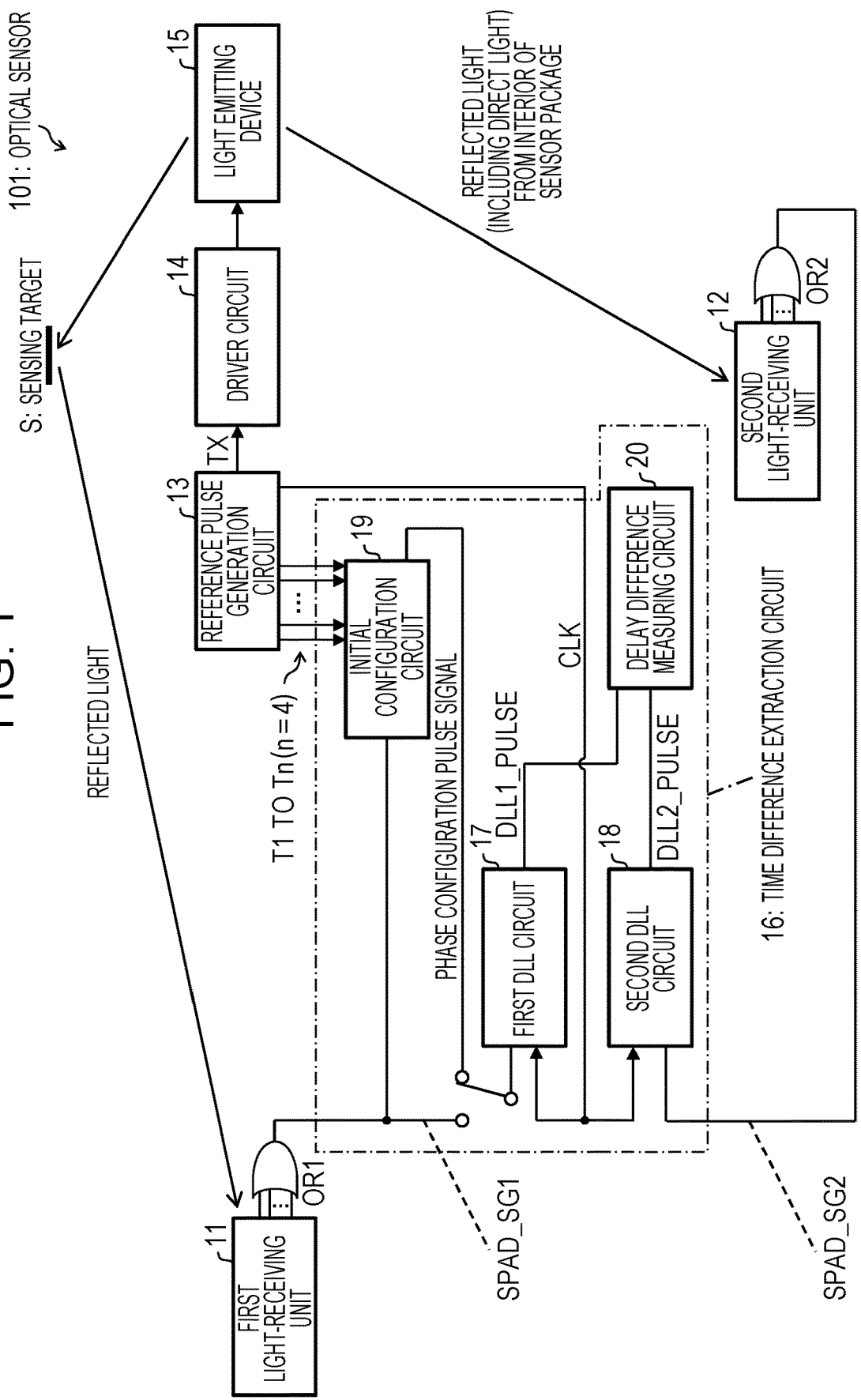
FIG. 1 is a view illustrating a circuit configuration of an optical sensor according to a first embodiment of the present invention.

FIG. 1 is a view illustrating a circuit configuration of an optical sensor 101 according to a first embodiment of the present invention.

The optical sensor 101 includes a first light-receiving unit 11 of a photon count-type, a second light-receiving unit 12 of a photon count-type, a reference pulse generation circuit 13, a driver circuit 14, a light emitting device 15, and a time difference extraction circuit 16. The first light-receiving unit 11 is configured to output a pulse in response to incidence of signal light to be measured, that is, to output a pulse synchronous with photon incidence caused by reflected light from a sensing target S. The second light-receiving unit 12 is disposed closer to the light emitting device 15 than the first light-receiving unit 11 is. The second light-receiving unit 12 is configured to output a pulse in response to reference light to be concurrently measured, that is, to output a pulse synchronous with photon incidence caused by reflected light (including direct light) in a sensor package. The reference pulse generation circuit 13 is configured to give a reference pulse (TX) to the driver circuit 14 and a reference clock (CLK) to the time difference extraction circuit 16. The driver circuit 14 is configured to pulse-drive the light emitting device 15. The time difference extraction circuit 16 is configured to extract a time difference between pulse outputs from the first light-receiving unit 11 and the second light-receiving unit 12.

In the optical sensor 101 having the above-described configuration, the distance to the sensing target S (reflection object) is obtained as described below. That is, when pulse light output from the light emitting device 15 is reflected off the sensing target S and enters the first light-receiving unit 11, and reflected light (including direct light) from the interior of a sensor package enters the second light-receiving unit 12, the first light-receiving unit 11 and the second light-receiving unit 12 output pulses at frequencies in accordance with amounts of the light. The pulses output are input, as pulse outputs having a time difference corresponding to a difference between distances on a spatial optical path, to the time difference extraction circuit 16. For the pulse output from the second light-receiving unit 12, the distance on the spatial optical path may be regarded as substantially 0. Thus, the time difference extraction circuit 16 extracts a time difference corresponding to the distance on the spatial optical path based on the two inputs (the pulse output of the first light-receiving unit 11 and the pulse output of the second light-receiving unit 12) and the reference clock (CLK) output from the reference pulse generation circuit 13 so as to obtain the distance to the sensing target S (reflection object). Moreover, in response to reception of light from the light emitting device 15, the pulse outputs from the first light-receiving unit 11 and the second light-receiving unit 12 randomly occur within a light emission width. Therefore, the time difference extraction circuit 16 adopts a first DLL circuit 17 and a second DLL circuit 18 which are Delay Locked Loop circuits, and after an initial configuration circuit 19 in the time difference extraction circuit 16 configures an initial phase value in the first DLL circuit 17, outputs of the first DLL circuit 17 and the second DLL circuit 18 are caused to lock with centers of light reception widths of the first light-receiving unit 11 and the second light-receiving unit 12 respectively so as to extract the time difference.

Schema of First Light-Receiving Unit 11 and Second Light-Receiving Unit 12

Figure 2:
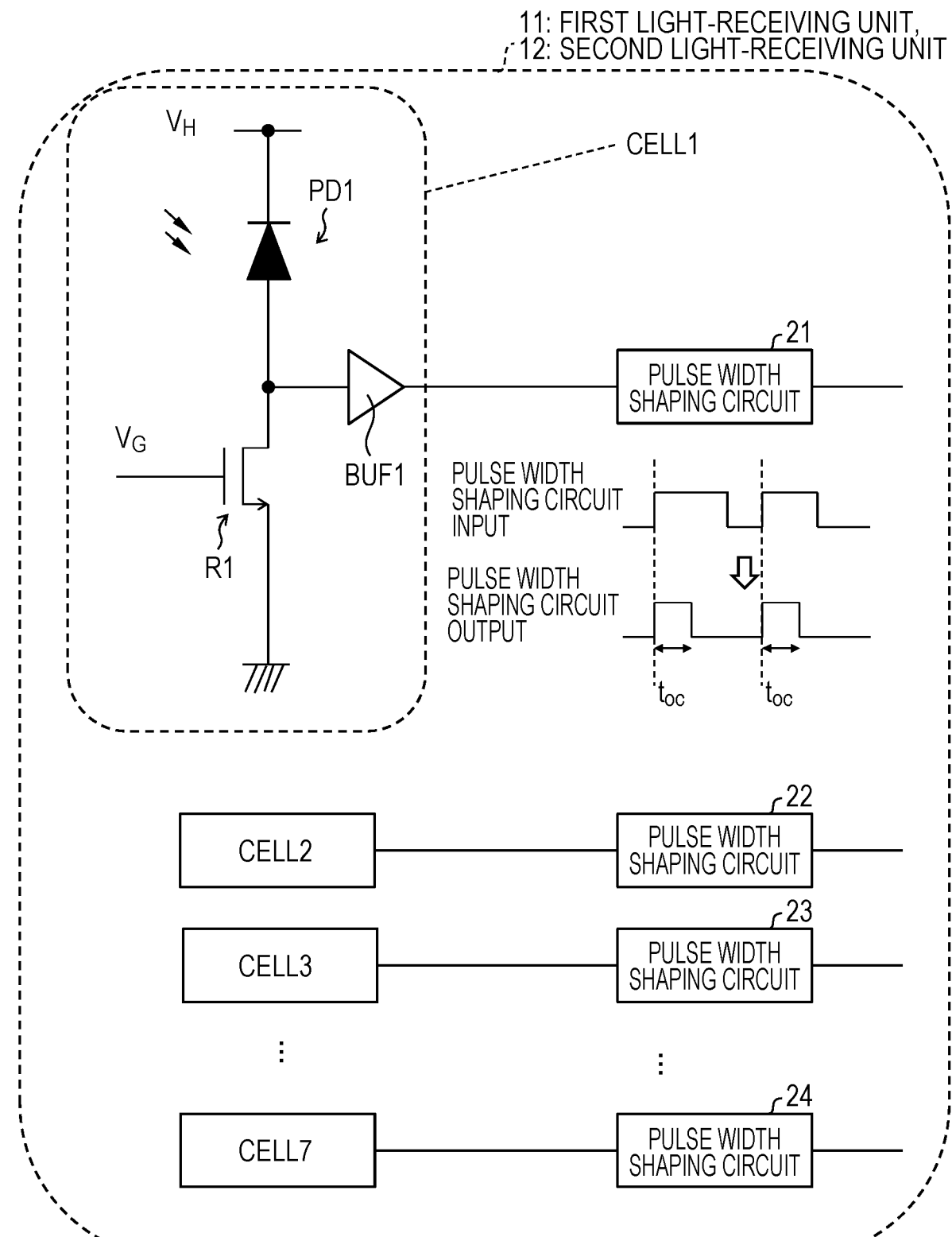
FIG. 2 is a view illustrating a circuit configuration of a first light-receiving unit and a second light-receiving unit.

FIG. 2 is a view illustrating a circuit configuration of the first light-receiving unit 11 and the second light-receiving unit 12.

In this embodiment, since the first light-receiving unit 11 and the second light-receiving unit 12 have the same configurations, the first light-receiving unit 11 is described as an example.

As illustrated in FIG. 2, the first light-receiving unit 11 includes a plurality of CELLs (CELLs 1 to 7) each including a photodiode PD1, an active quenching resistor R1 (resistor component of a MOS transistor), and a buffer BUF1. In this embodiment, seven CELLs are provided, but the number of the CELLs is not limited to this embodiment.

The photodiode PD1 is an avalanche photodiode in a Geiger mode, and from the photodiode PD1, an incident light amount is extracted, as a pulse output, by the active quenching resistor R1 and the buffer BUF1. The output pulses of the CELLs 1 to 7 of the first light-receiving unit 11 pass through pulse width shaping circuits 21, 22, 23, and 24 so that pulse widths are shaped into fixed time widths ($t_{oc}$), and the output pulses are then subjected to an OR operation performed by an OR1 shown in FIG. 1.

Configuration of First DLL Circuit and Second DLL Circuit

Figure 3:
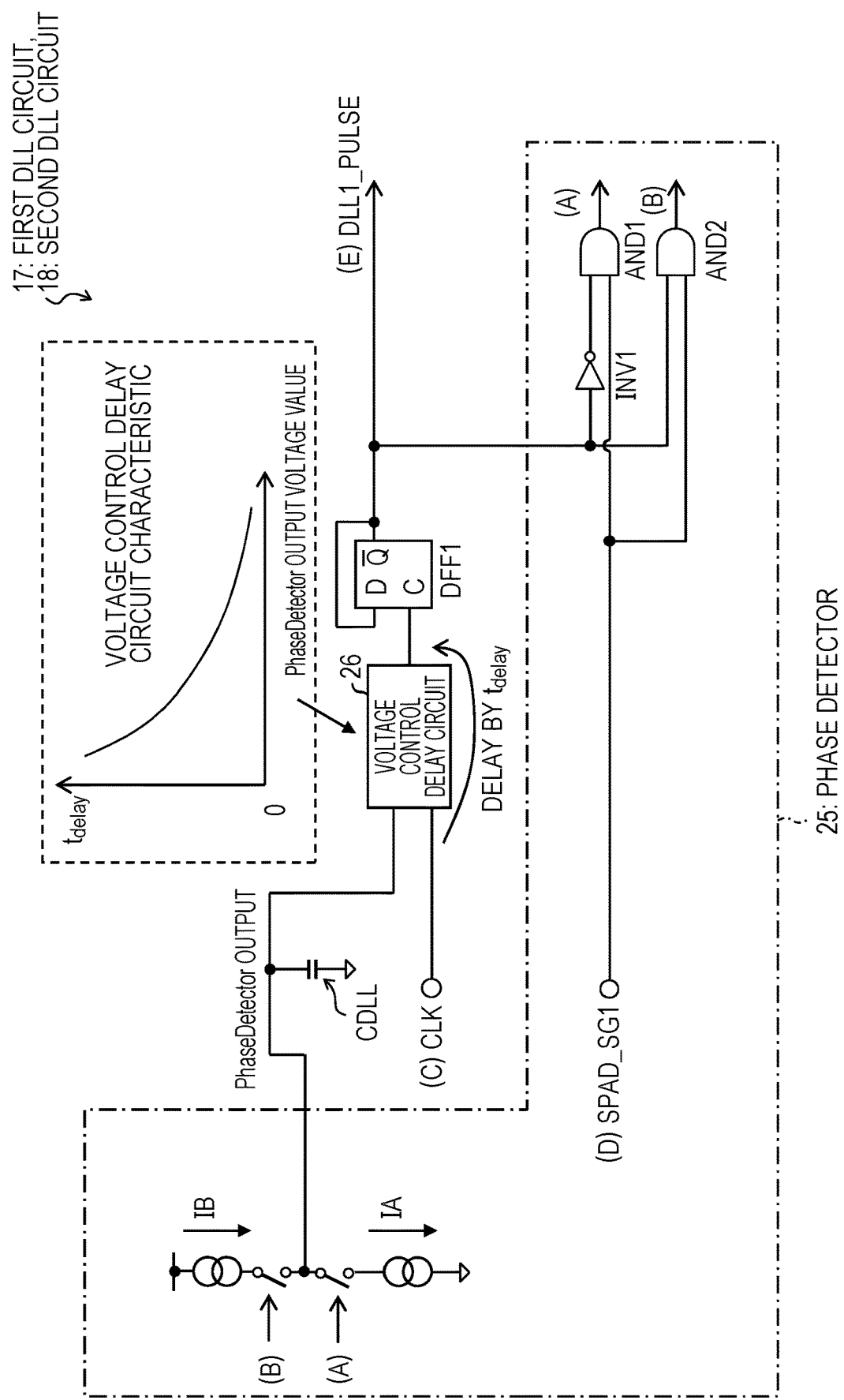
FIG. 3 is a block diagram illustrating a first DLL circuit and a second DLL circuit.

FIG. 3 is a block diagram illustrating the first DLL circuit 17 and the second DLL circuit 18 included in the time difference extraction circuit 16.

Since the first DLL circuit 17 and the second DLL circuit 18 have the same configurations, the first DLL circuit 17 is described below as an example.

As illustrated in FIG. 3, the first DLL circuit 17 includes a phase detector 25, a voltage control delay circuit 26, and a capacitance element CDLL which holds a control voltage of the voltage control delay circuit 26. An operation by an AND2 results in that (B)=1 when (E) DLL1_PULSE=1 and (D) SPAD_SG1=1, and a switch element configured to close with (B) shown in FIG. 3 being 1 closes to allow a current IB to flow to the capacitor CDLL. On the other hand, operations by an AND1 and an INV1 result in that (A)=1 when (E) DLL1_PULSE=0 and (D) SPAD_SG1=1, and a switch element configured to close with (A) shown in FIG. 3 being 1 closes to allow a current IA to flow to the capacitor CDLL.

According to the operation described above, the input voltage of the voltage control delay circuit 26 is determined based on the voltage of the CDLL, and a clock obtained by delaying (C) reference clock (CLK) by $t_{delay}$ is input to DFF1. A negative output of the DFF1 is input to D of the DFF1, thereby providing (E) DLL1_PULSE having a frequency that is ½ of the frequency of (C) reference clock (CLK) and having Duty of 50%. The Duty becomes 50%, and therefore, when a disturbance ight component other than light received from the light emitting device 15 uniformly enters (D) SPAD_SG1, the current IA=IB with sufficient time integration, and thus, it is possible to remove the disturbance light component. Note that the second DLL circuit 18 in the time difference extraction circuit 16 is similar to the first DLL circuit 17 in configuration.

Operation of First DLL Circuit and Second DLL Circuit

Here, since the operation of the first DLL circuit 17 is the same as the operation of the second DLL circuit 18, the operation of the first DLL circuit 17 is described below as an example.

Figure 4:
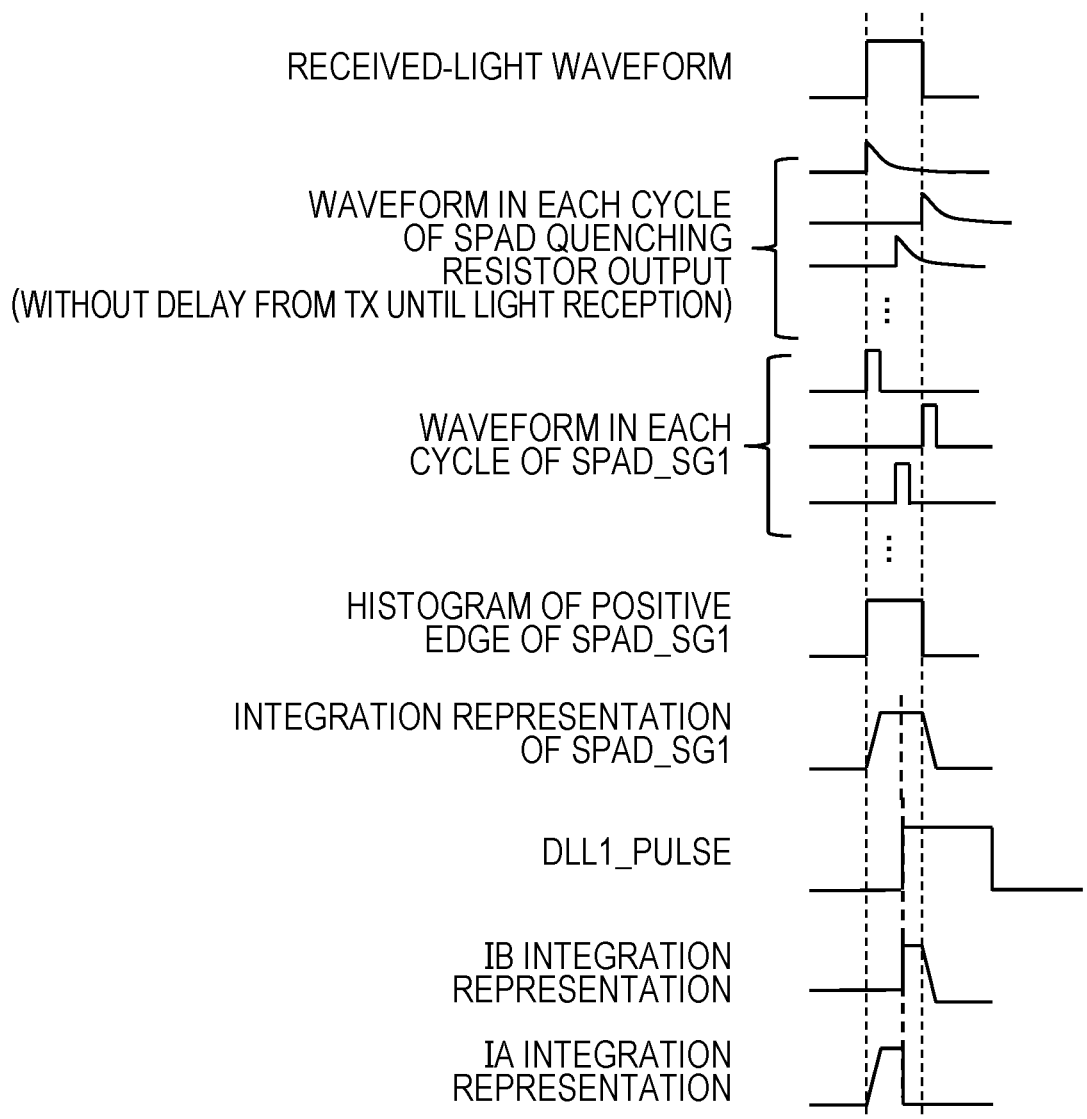
FIG. 4 is a waveform diagram illustrating an operation of the first DLL circuit shown in FIG. 3.

FIG. 4 is a waveform diagram illustrating the operation of the first DLL 17 circuit shown in FIG. 3.

As illustrated in FIG. 4, when with respect to a waveform in a case of the first light-receiving unit 11 receiving light (received-light waveform), a rising edge of DLL1_PULSE comes to a position at which a waveform obtained by integrating a randomly generated waveform of SPAD_SG1 (integral representation of SPAD_SG1 in FIG. 4) is divided into two equal parts, the integrated value of IB in IB integral representation in FIG. 4 matches with the integrated value of IA in IA integral representation in FIG. 4, and therefore, this state is a lock state.

Operation of Optical Sensor

Figure 5:
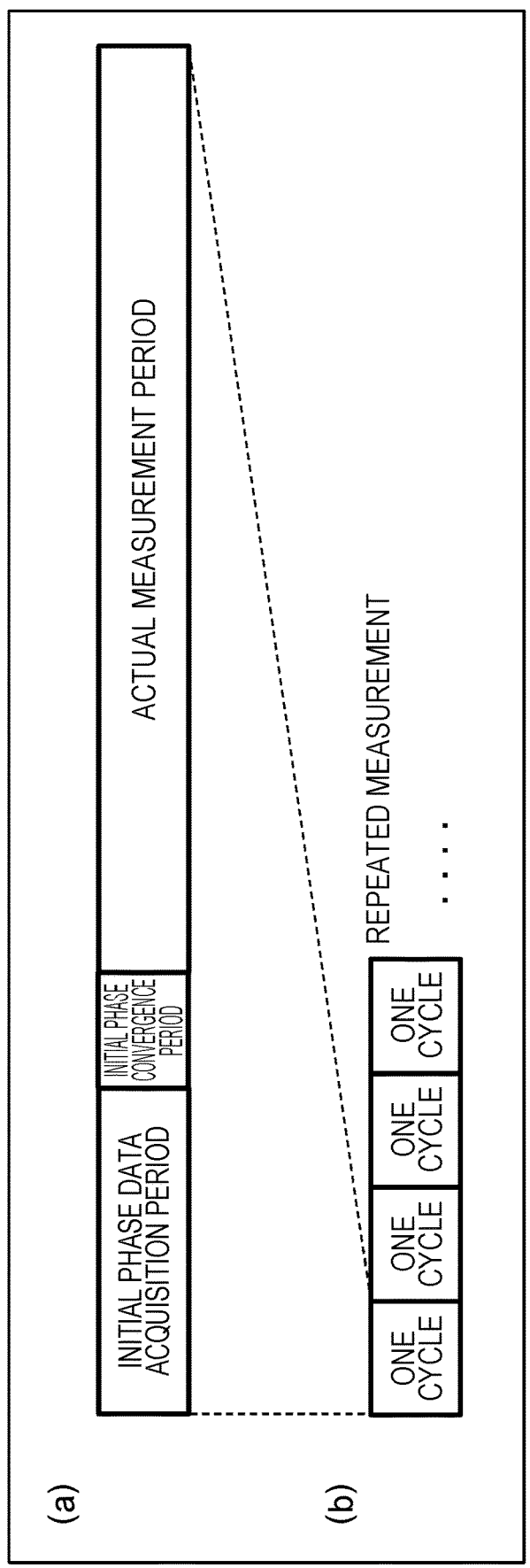
FIG. 5 is a view illustrating an operation state of the optical sensor according to the first embodiment of the present invention.

FIG. 5 is a view illustrating an operation state of the optical sensor 101.

As illustrated in (a) of FIG. 5, one cycle in which the optical sensor 101 performs measurement includes an initial phase data acquisition period, an initial phase convergence period, and an actual measurement period. The initial phase data acquisition period is followed by the initial phase convergence period. The initial phase convergence period is followed by the actual measurement period.

As illustrated in (b) of FIG. 5, the measurement by the optical sensor 101 is cyclically performed, and the initial phase data acquisition period, the phase convergence period, and the actual measurement period are repeated for each cycle.

During the initial phase data acquisition period which is a period before the actual measurement period for measuring a distance and before the initial phase convergence period, the number of pulse outputs from the first light-receiving unit 11 in each of regions obtained by dividing each cycle of the reference clock (CLK) into n equal parts (n≥2, n is an integer) (in the present embodiment, n=4, from a first region to a fourth region) is counted, which will be described in detail later.

Moreover, during the initial phase convergence period which is a period before the actual measurement period for measuring a distance and after the initial phase data acquisition period, an initial phase value of the first DLL circuit 17 is configured, which will be described in detail later.

Description of Initial Phase Data Acquisition Period

Figure 6:
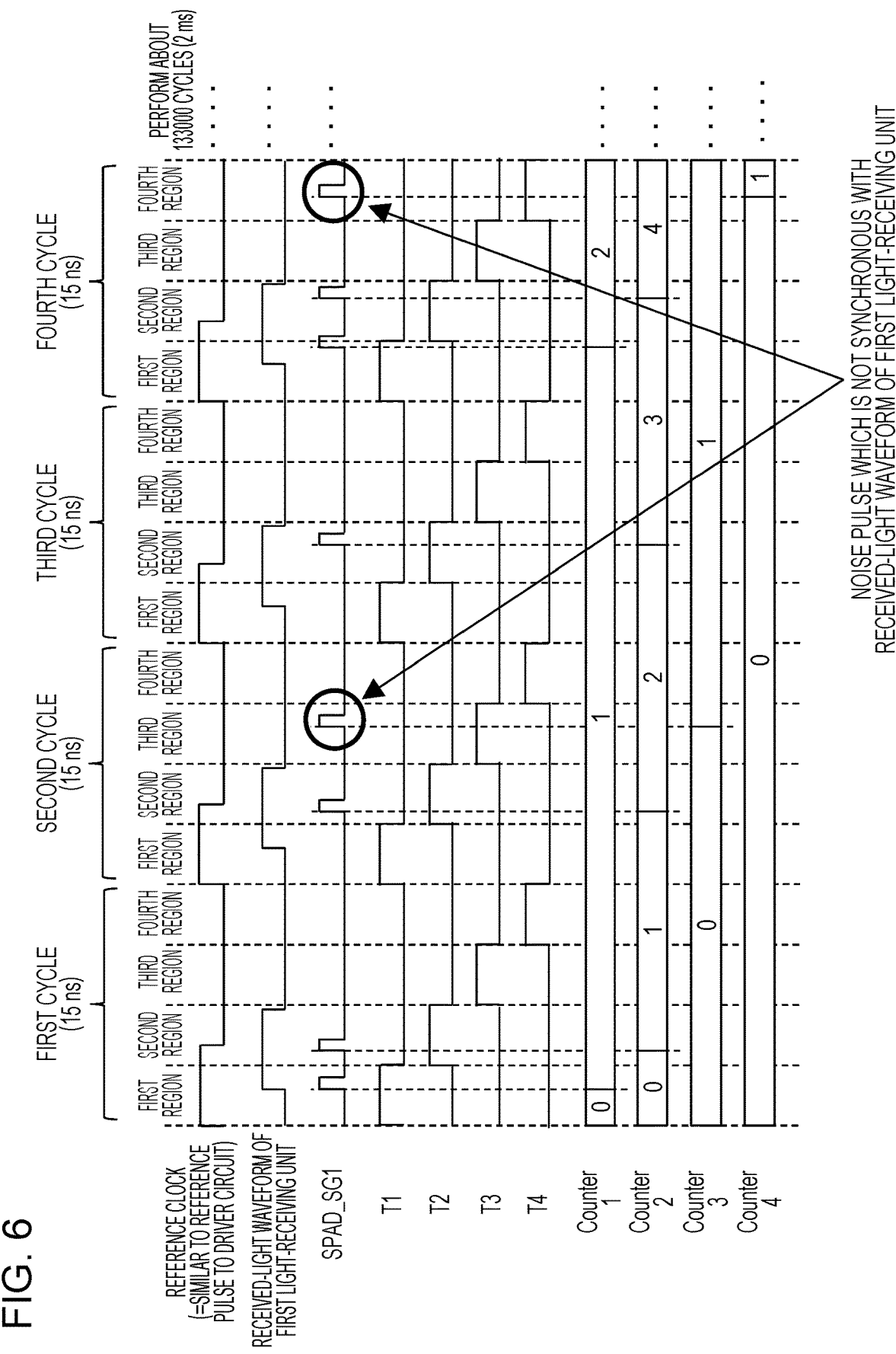
FIG. 6 is a view illustrating an operation of an initial configuration circuit included in the optical sensor according to the first embodiment of the present invention.
Figure 7:
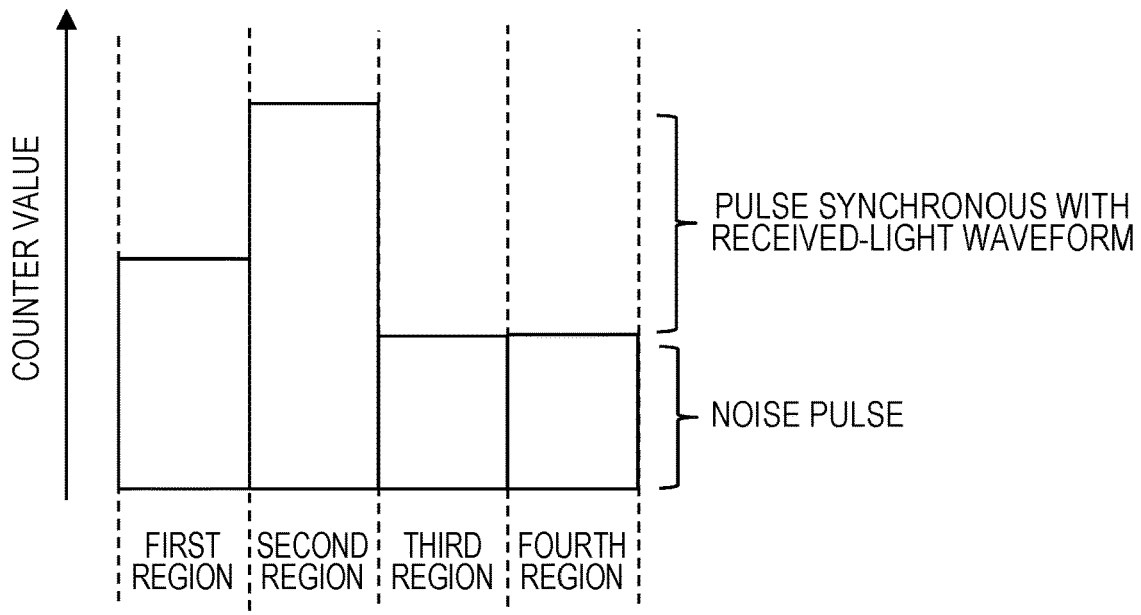
FIG. 7 is a histogram illustrating counter values in the initial configuration circuit included in the optical sensor according to the first embodiment of the present invention.

With reference to FIGS. 6 and 7, the initial phase data acquisition period will be described below.

FIG. 6 is a view illustrating an operation of the initial configuration circuit 19 included in the optical sensor 101 shown in FIG. 1.

The reference pulse generation circuit 13 included in the optical sensor 101 shown in FIG. 1 gives the reference pulse (TX) to the driver circuit 14 during the initial phase data acquisition period to cause the light emitting device 15 to emit pulse light in the same manner as during the actual measurement period. Note that the reference pulse (TX) output from the reference pulse generation circuit 13 to the driver circuit 14 and the reference clock (CLK) output from the reference pulse generation circuit 13 to the time difference extraction circuit 16 may be the same, and in the present embodiment, the same signals are used as the reference pulse (TX) and the reference clock (CLK).

As illustrated in FIG. 6, the received-light waveform of the first light-receiving unit 11 is a waveform delayed by a fixed time from the reference clock (CLK) due to a light emission delay of the light emitting device 15 caused by a reception delay of the reference pulse (TX) and due to a delay corresponding to a distance on a spatial optical path where light transmitted from the light emitting device 15 is reflected off the sensing target S and returned.

In each of regions (first region to fourth region) obtained by dividing each cycle (first cycle, second cycle, third cycle, fourth cycle . . . ) of the reference pulse (TX), which is obtained from the reference pulse generation circuit 13 and which is the same signal as the reference clock (CLK), into four equal parts, a T1 waveform whose High voltage corresponds to the first region, a T2 waveform whose High voltage corresponds to the second region, a T3 waveform whose High voltage corresponds to the third region, and a T4 waveform whose High voltage corresponds to the fourth region are used to count output pulses (SPAD_SG1) from the first light-receiving unit 11 in each region by Counters 1 to 4.

During the first cycle and the third cycle in FIG. 6, the output pulse (SPAD_SG1) from the first light-receiving unit 11 provides a pulse (a pulse caused due to reflected light from the sensing target S by the light emitting device 15) synchronous with the received-light waveform of the first light-receiving unit 11. However, the second cycle and the fourth cycle in FIG. 6 include a noise pulse caused due to disturbance light and/or a thermally generated carrier and corresponding to the output pulse (SPAD_SG1) from the first light-receiving unit 11 which is not synchronous with the received-light waveform of the first light-receiving unit 11.

FIG. 7 is a histogram illustrating counter values in the initial configuration circuit 19 included in the optical sensor 101.

As illustrated in the figure, the histogram shows counter values in the first to fourth regions during the initial phase data acquisition period. The initial configuration circuit 19 includes a comparator for results of the counting and determines, among the regions, a region in which the count value is largest.

It is not possible to distinguish the pulse synchronous with the received-light waveform of the first light-receiving unit 11 from the noise pulse. However, the noise pulse is uniformly generated both in a region in which the received-light waveform is obtained and a region in which the received-light waveform is not obtained, whereas the pulse synchronous with the received-light waveform is generated only in the region in which the received-light waveform is obtained. Therefore, it can be seen that a region in which the counter value is the largest value is a region closest to the position of the received-light waveform. In the present embodiment, the region in which the counter value is the largest value is the second region. Thus, during the initial phase convergence period, which will be described in detail later, the initial phase of the first DLL circuit 17 is matched to the second region.

Note that in the present embodiment, the initial phase data acquisition period in one cycle shown in (a) and (b) of FIG. 5 is about 2 ms, the received-light waveform of the first light-receiving unit 11 has a cycle of 15 ns, and the initial phase data acquisition period includes about 133000 cycles.

For the sake of description, FIG. 6 depicts the occurrence frequency of the waveform of the output pulse (SPAD_SG1) from the first light-receiving unit 11 as being high, and the number of occurrences of pulses actually generated in synchronization with the received-light waveform depends on the distance to the sensing target S and is the number of occurrences of about thousands of counts during the initial phase data acquisition period of 2 ms.

Description of Initial Phase Convergence Period

During the initial phase convergence period, the initial configuration circuit 19 outputs, of the T1 to T4 waveforms, a waveform (in the present embodiment T2) whose High voltage corresponds to a region (in the present embodiment, the second region) closest to the position of the received-light waveform of the first light-receiving unit 11 obtained during the initial phase data acquisition period, as a phase configuration pulse signal to the first DLL circuit 17, and the initial configuration circuit 19 causes the first DLL circuit 17 to perform a converging operation to the region closest to the position of the received-light waveform of the first light-receiving unit 11 (specifically, in FIG. 3, the phase configuration pulse signal is input to (D) SPAD_SG1).

Figure 8:
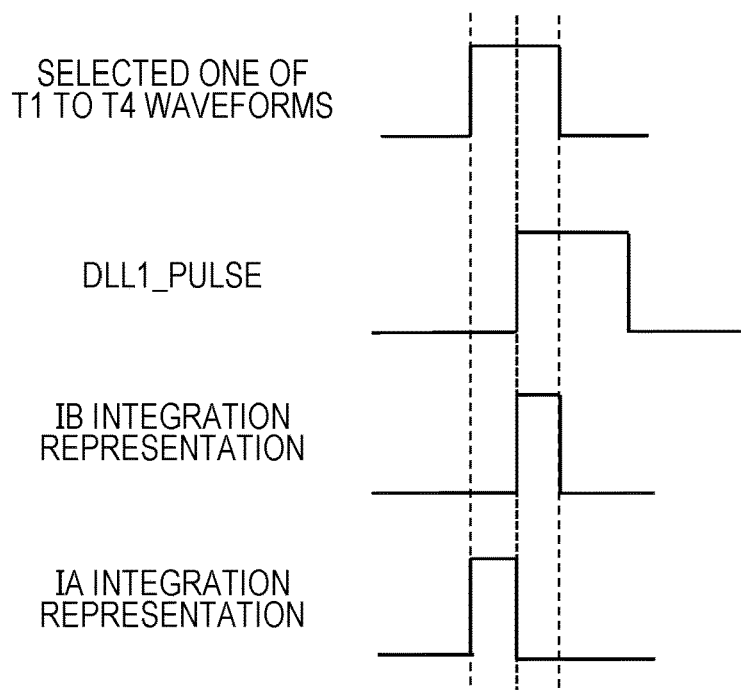
FIG. 8 is a waveform diagram illustrating an operation of the first DLL circuit during an initial phase convergence period.

FIG. 8 is a waveform diagram illustrating an operation of the first DLL circuit 17 during the initial phase convergence period.

As illustrated in the figure, when a rising edge of DLL1_PULSE comes to a position at which the selected waveform (in the present embodiment, T2) of the T1 to T4 waveforms is divided into two equal parts, the integrated value of IB in IB integral representation in FIG. 8 matches with the integrated value of IA in IA integral representation in FIG. 8, and therefore, this state is a lock state.

With this operation, the initial phase value of the first DLL circuit 17 is set to a position close to the received-light waveform of the first light-receiving unit 11, that is, a position close to a generation region of a pulse caused due to reflected light from the sensing target S by the light emitting device 15.

Thus, during the actual measurement period, the actual measurement is started from a closely matched state of the phase of the first DLL circuit 17, and during the actual measurement period, the variation of a Phase Detector output voltage value is reduced as illustrated in FIG. 3.

Figure 9:
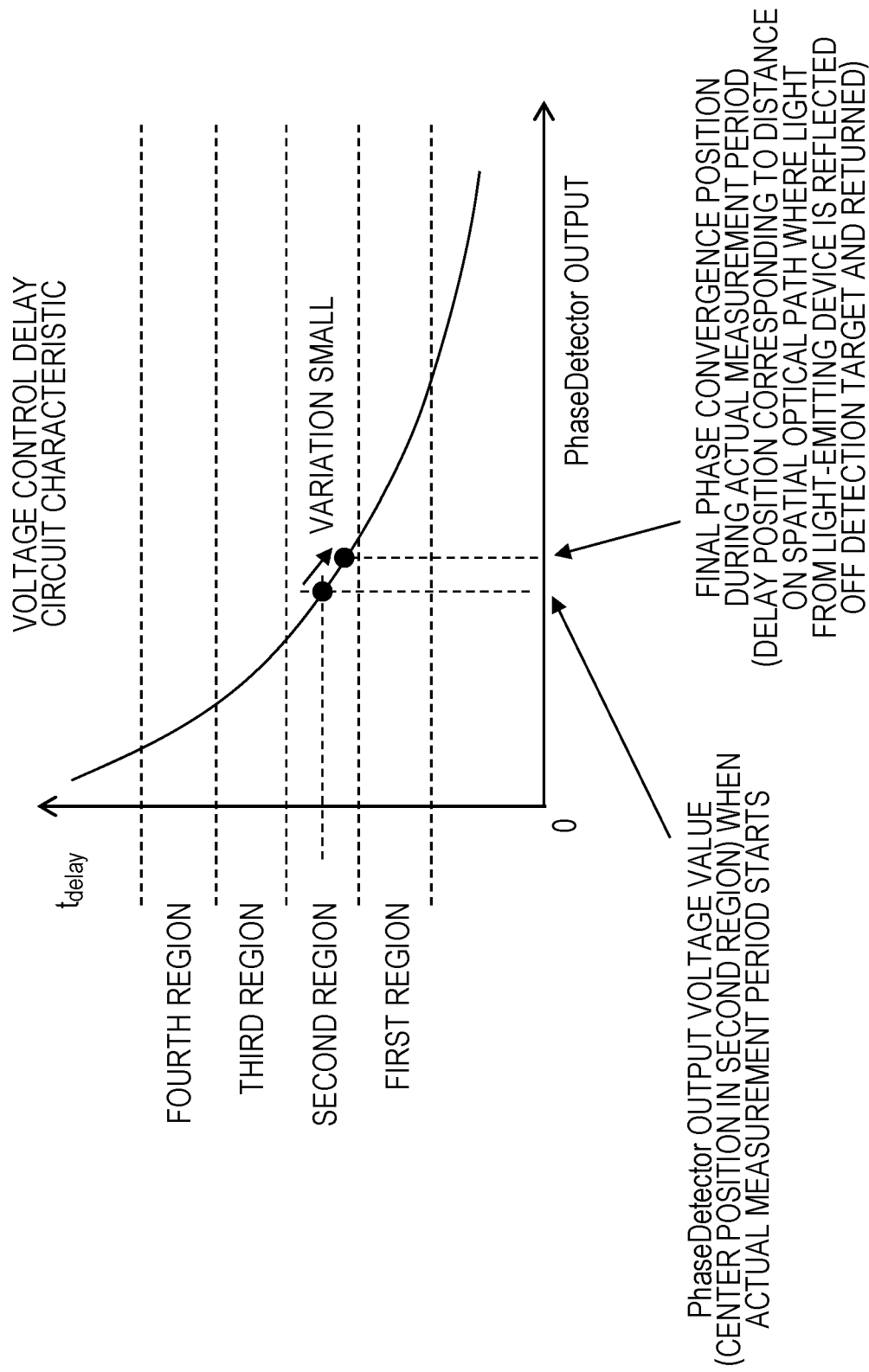
FIG. 9 is a view illustrating a voltage control delay circuit characteristic in the first DLL circuit.

FIG. 9 is a view illustrating a voltage control delay circuit characteristic in the first DLL circuit 17 in a case where the counter value in the second region is largest during the initial phase data acquisition period.

As illustrated in FIG. 9, a variation from the Phase Detector output voltage value (center position of the second region) at the start of the actual measurement period to a final phase convergence position during the actual measurement period is small. The final phase convergence position during the actual measurement period is, in other words, a delay position corresponding to the distance on a spatial optical path where light transmitted from the light emitting device 15 is reflected off the sensing target S and returned (a position at which DLL_PULSE1 in FIG. 4 divides the integral representation of SPAD_SG1 into two equal parts). Thus, the phase can reach the final phase convergence position in a short time. Therefore, it is possible to reduce a measurement time without deteriorating the accuracy.

Moreover, as illustrated in FIG. 5, acquiring initial phase data for each cycle enables the initial phase to be determined always immediately before the actual measurement period, which enables the measurement time to be reduced also for the sensing target S which is movable and the distance to which changes for each measurement.

Second Embodiment

Another embodiment of the present invention will be described below. Note that for the sake of description, members having the same function as the members described in the first embodiment are denoted by the same reference signs as those in the first embodiment, and the description thereof will be omitted.

Figure 10:
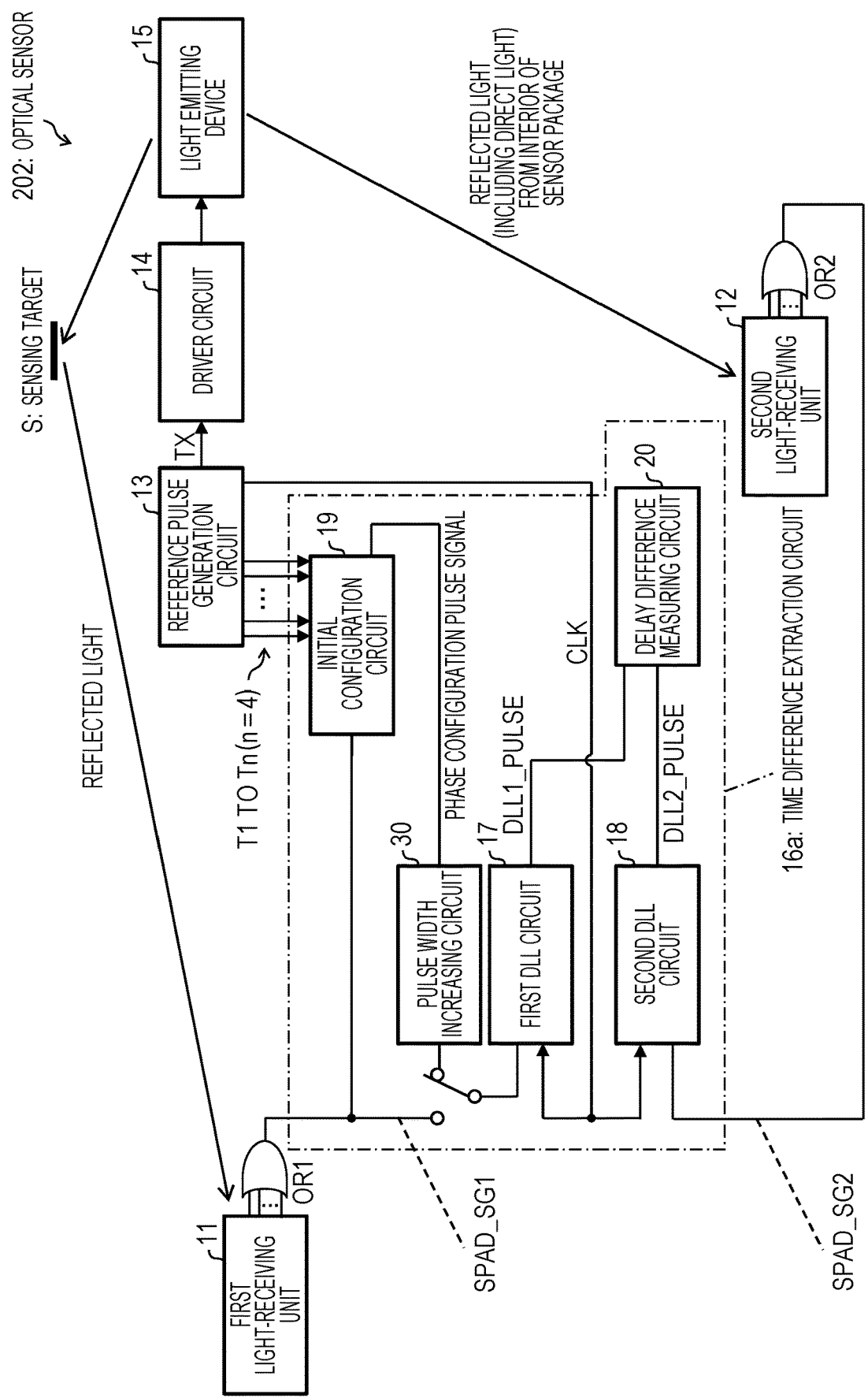
FIG. 10 is a view illustrating a circuit configuration of an optical sensor according to a second embodiment of the present invention.

FIG. 10 is a view illustrating a circuit configuration of an optical sensor 202.

Note that similarly to the first embodiment, the present embodiment also describes an example in which the number of pulse outputs from a first light-receiving unit 11 in first to fourth regions obtained by dividing each cycle of a reference clock (CLK) into four equal parts is counted, but the present embodiment is not limited to this example, and each cycle of the reference clock (CLK) may be divided into n equal parts (n≥2, n is an integer).

The optical sensor 202 is different from the optical sensor 101 already described in the first embodiment in that a pulse width increasing circuit 30 is provided.

As illustrated in the figure, a phase configuration pulse signal output from an initial configuration circuit 19 is input to the pulse width increasing circuit 30.

Figure 11:
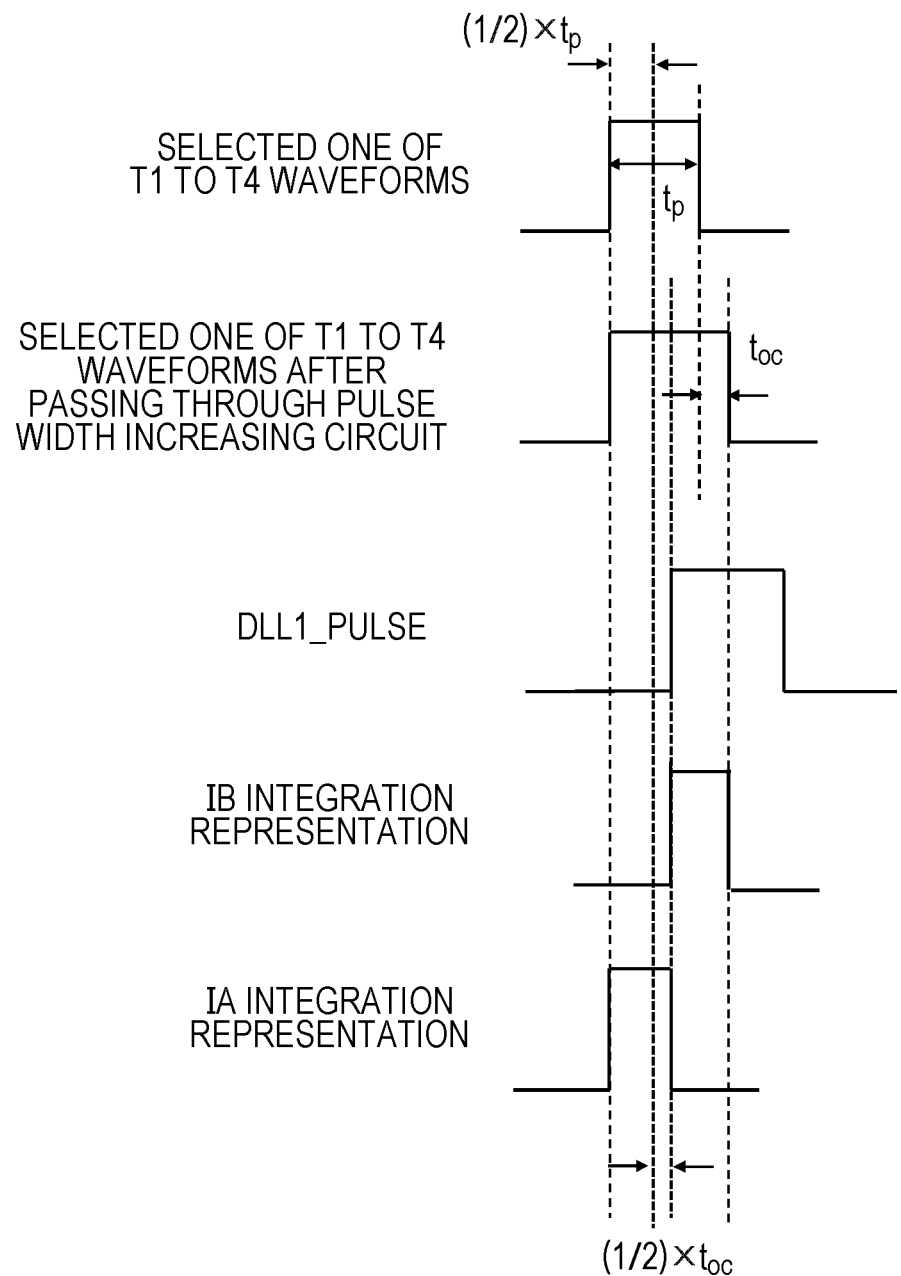
FIG. 11 is a waveform diagram illustrating an operation of a first DLL circuit during an initial phase convergence period in the optical sensor according to the second embodiment of the present invention.

FIG. 11 is a waveform diagram illustrating an operation of a first DLL circuit 17 in the optical sensor 202 during an initial phase convergence period.

As illustrated in the figure, during the initial phase convergence period, one of T1 to T4 waveforms which is selected based on a result of an initial phase data acquisition period and which has a pulse width $t_p$ is input as a phase configuration pulse signal to the pulse width increasing circuit 30 from the initial configuration circuit 19.

In the pulse width increasing circuit 30, the phase configuration pulse signal is increased by a width equal to a pulse width $t_{oc}$ (see FIG. 2) obtained by pulse shaping circuits 21, 22, 23, and 24 in the first light-receiving unit 11 and a second light-receiving unit 12 to have a pulse width $(t_p+t_{oc})$ and is then input to a first DLL circuit 17. When a rising edge of DLL1_PULSE comes to a position at which the waveform having the pulse width increased is divided into two equal parts, the integrated value of IB in IB integral representation in FIG. 11 matches with the integrated value of IA in IA integral representation in FIG. 11, and therefore, this state is a lock state.

As illustrated in the figure, as compared to the case where the pulse width increasing circuit 30 is not provided (the first embodiment), the phase of DLL1_PULSE converges to a position shifted behind by $(½)×t_{oc}$.

When it is determined based on a count value during the initial phase data acquisition period that, for example, a second region is a position closest to the received-light waveform of the first light-receiving unit, an accurate position of the received-light waveform is not known. Therefore, a center position of the received-light waveform is assumed to be the center of the second region so that the difference from the actual position becomes minimum.

Figure 12:
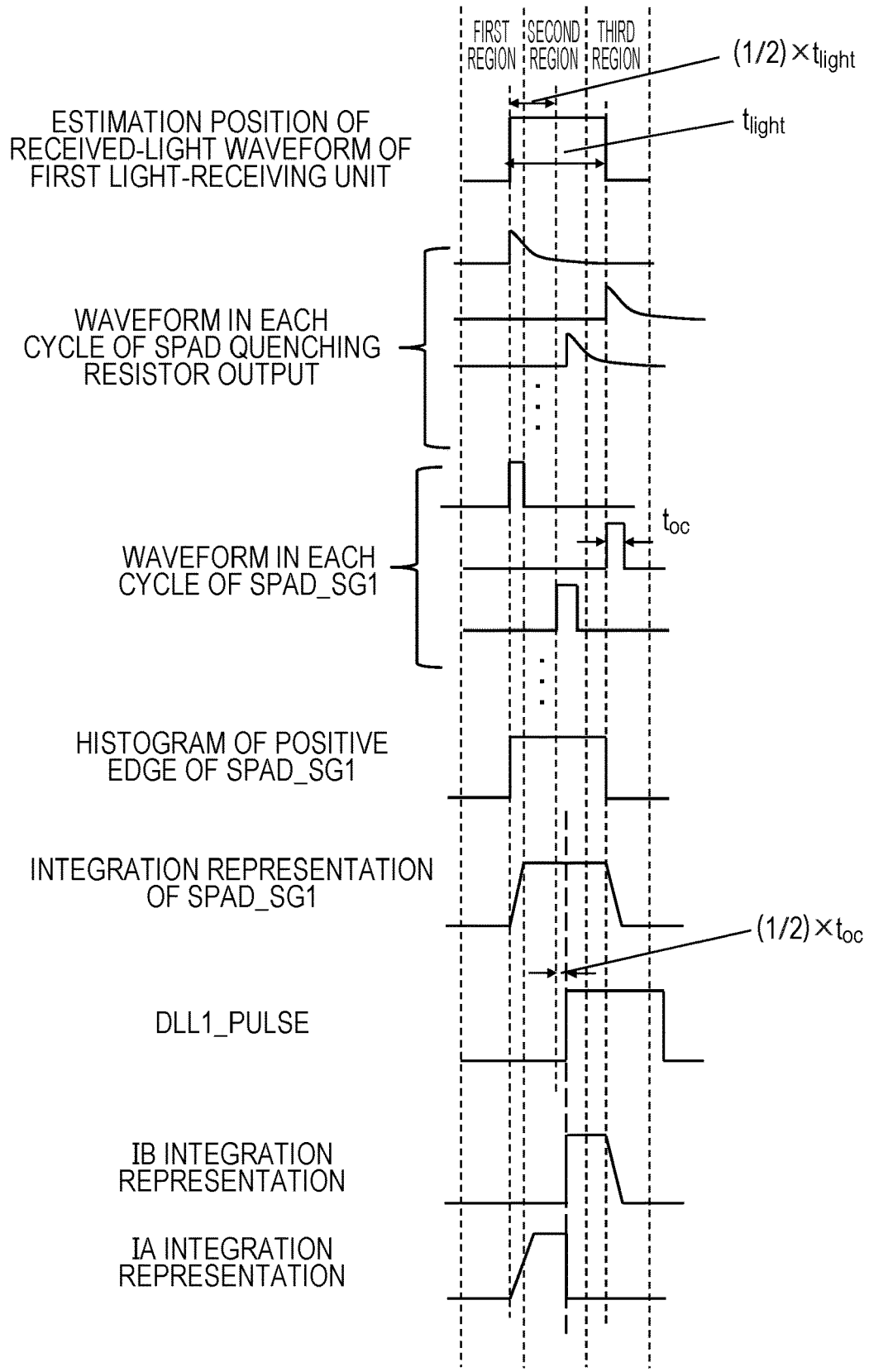
FIG. 12 is a waveform diagram illustrating the operation of the first DLL circuit in the optical sensor according to the second embodiment of the present invention.

FIG. 12 is a waveform diagram illustrating the operation of the first DLL circuit 17 included in the optical sensor 202.

As illustrated in the figure, when the received-light waveform of the first light-receiving unit 11 is at the center of the second region, the phase of the waveform of DLL1_PULSE converges to a position shifted behind by $(½)×t_{oc}$ from the center of the second region (=the assumed center position of the received-light waveform), and the waveform of DLL1_PULSE matches with a phase convergence position of a case where a waveform obtained by increasing an output of a phase configuration pulse signal shown in FIG. 11 (selected one of the T1 to T4 waveforms) to have a pulse width $(t_p+t_{oc})$ by the pulse width increasing circuit 30 is input to the first DLL circuit 17. Therefore, the position of the initial phase of the first DLL circuit 17 is optimized as compared to the optical sensor 101 described in the first embodiment.

Third Embodiment

Another embodiment of the present invention will be described below. Note that for the sake of description, members having the same function as the members described in the first and second embodiments are denoted by the same reference signs as those in the first and second embodiments, and the description thereof will be omitted.

The configuration according to the present embodiment is a configuration which reduces the number of counters used during an initial phase data acquisition period.

The first and second embodiments have described an example including four counters which are used during the initial phase data acquisition period and which are provided in the initial configuration circuit 19. However, the present embodiment describes an example including two counters provided in an initial configuration circuit 19.

Figure 13:
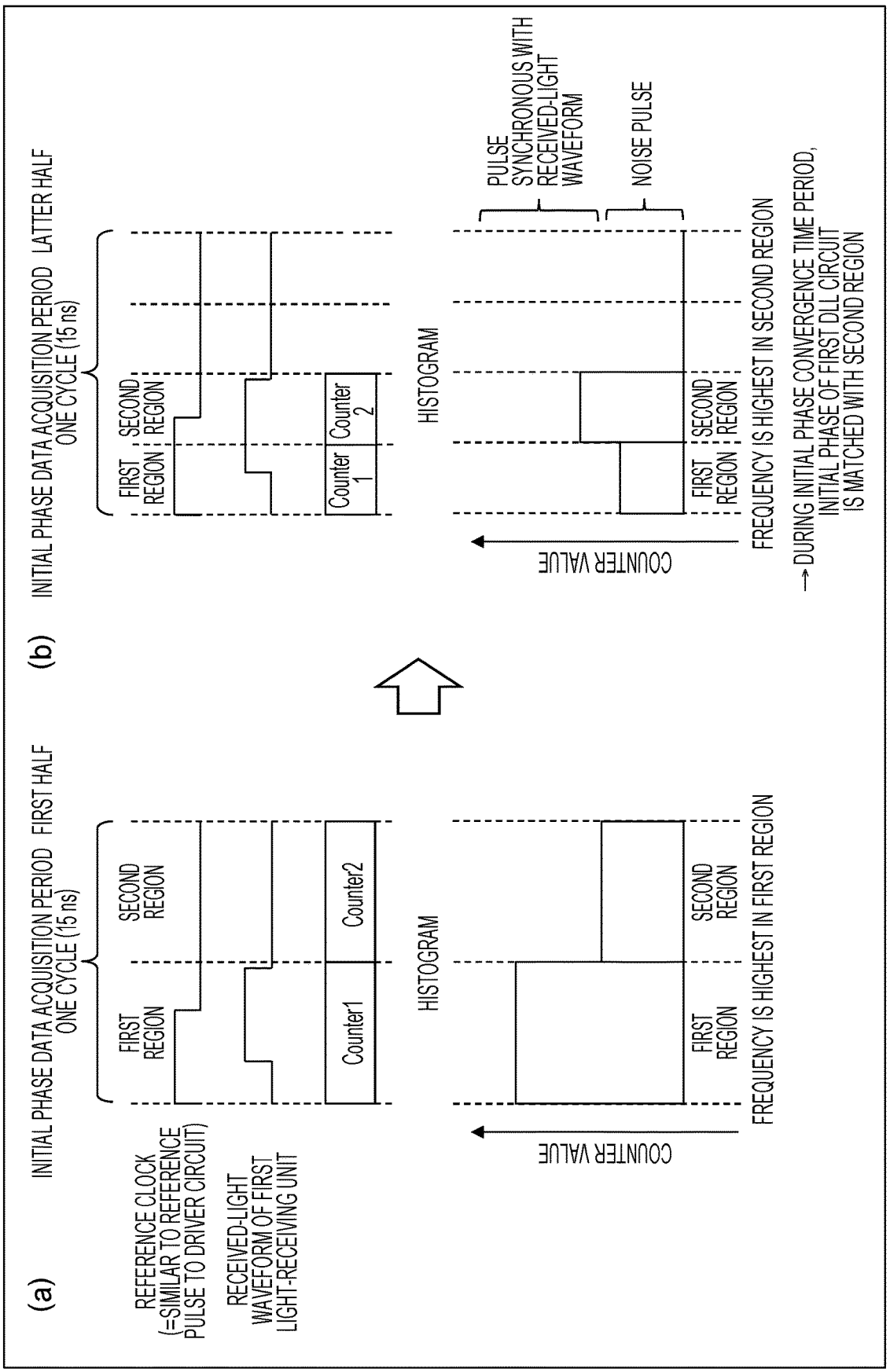
FIG. 13 is a view illustrating an operation of an initial configuration circuit included in an optical sensor according to a third embodiment of the present invention.
Figure 14:
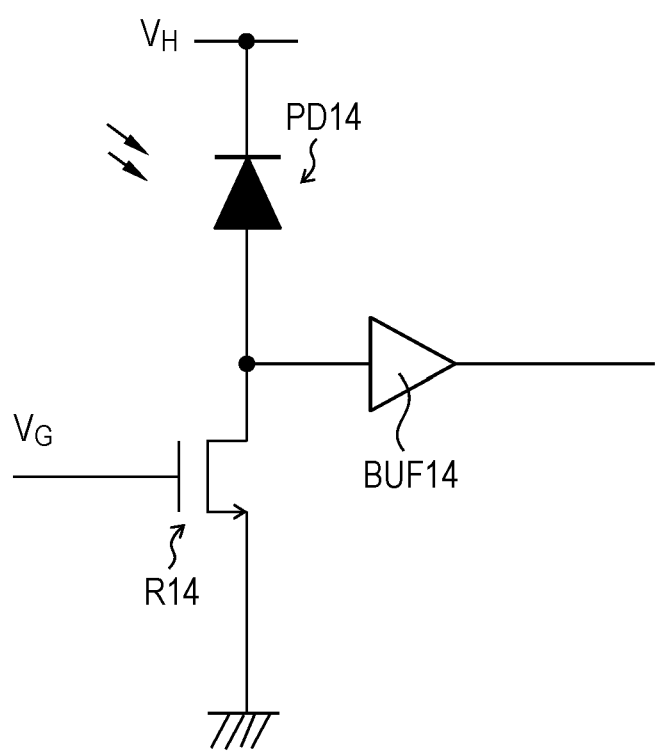
FIG. 14 is a view illustrating a photon counting circuit configuration including an avalanche photodiode.

FIG. 13 is a view illustrating an operation of the initial configuration circuit 19 included in an optical sensor according to the present embodiment.

As illustrated in the figure, the initial phase data acquisition period is divided into two equal parts, and during the first half period, the number of pulse outputs from a first light-receiving unit 11 is counted in each of regions (first region and second region) obtained by dividing the cycle of a reference pulse (TX) equal to a reference clock (CLK) into two equal parts, and a region in which a count value is largest is determined. Thus, during the first half period of the initial phase data acquisition period, two counters (Counter 1 and Counter 2) are used.

During the latter half period of the initial phase data acquisition period, a counter value is obtained in each of regions (a first region and a second region in (b) of FIG. 13) obtained by further dividing the determined region in which the counter value is largest (the first region in (a) of FIG. 13) into two equal parts. Thus, also during the latter half period of the initial phase data acquisition period, two counters (Counter 1 and Counter 2) are used.

Thus, in the present embodiment, it becomes possible to find region corresponding to the largest count among regions obtained by dividing the reference pulse (TX) into four equal parts by the two counters (a half of the number of counters in the first and second embodiments), and reducing the circuit chip size enables the optical sensor to be downsized.

Electronic Device

An electronic device may include the optical sensor described in each of the first to third embodiments described above. Specifically, examples of such an electronic device include cameras, robot cleaners, and smartphones.

SUMMARY

An optical sensor according to a first aspect of the present invention includes: a light emitting device; a first light-receiving unit of a photon count-type configured to output a pulse synchronous with photon incidence caused by reflected light from a sensing target; a second light-receiving unit of a photon count-type disposed closer to the light emitting device than the first light-receiving unit is, the second light-receiving unit being configured to output a pulse synchronous with photon incidence caused by reflected light in a sensor package; a time difference extraction circuit including a first DLL circuit configured to receive a pulse output from the first light-receiving unit and a reference clock and a second DLL circuit configured to receive a pulse output from the second light-receiving unit and the reference clock, the time difference extraction circuit being configured to extract a time difference corresponding to a distance on a spatial optical path; and an initial configuration circuit configured to give an initial phase value to the first DLL circuit, wherein the initial configuration circuit includes a means for giving an initial phase value of the first DLL circuit within a region including first to nth regions obtained by dividing each of cycles of the reference clock into n equal parts, where n is an integer larger than or equal to 2, a counter configured to perform counting of the number of pulse outputs from the first light-receiving unit in the first to nth regions, and a comparator for results of the counting, the initial configuration circuit determines by the comparator, a region in which a counter value is largest among the first to nth regions, and the initial configuration circuit gives, as the initial phase value, the region determined to the first DLL circuit to cause the first DLL circuit to perform a converging operation.

The above-described configuration includes the initial configuration circuit which includes the counter. The counter is configured to perform counting of the number of pulse outputs from the first light-receiving unit in the first to nth regions obtained by dividing each cycle of the reference clock into n equal parts, where n is an integer larger than or equal to 2. The initial configuration circuit is configured to determine by the comparator, a region in which a counter value is largest among the first to nth regions and to cause the first DLL circuit to perform a converging operation to the region determined. Thus, the convergence time of the first DLL circuit is advanced in the measurement, and a reduction in the measurement time can be realized while the accuracy is maintained.

In an optical sensor according to a second aspect of the present invention referring to the first aspect, a measurement cycle includes an initial phase data acquisition period, an initial phase convergence period, and an actual measurement period, during the initial phase data acquisition period, the initial configuration circuit determines by the comparator, the region in which the counter value is largest among the first to nth regions, and during the initial phase convergence period, the initial configuration circuit causes the first DLL circuit to perform a converging operation to the region determined.

With this configuration, the convergence time of the first DLL circuit is advanced in the measurement, and a reduction in the measurement time can be realized while the accuracy is maintained.

In an optical sensor according to a third aspect of the present invention referring to the first or second aspect, the initial configuration circuit may output, as a phase configuration pulse signal, a signal cyclically achieving a High voltage in the region in which the counter value is largest to the first DLL circuit to cause the first DLL circuit to perform a converging operation to the region determined.

With this configuration, the convergence time of the first DLL circuit is advanced in the measurement, and a reduction in the measurement time can be realized while the accuracy is maintained.

In an optical sensor according to a fourth aspect of the present invention referring to the first or second aspect, the initial configuration circuit may output, as a phase configuration pulse signal, a signal cyclically achieving a High voltage in the region in which the counter value is largest to a pulse width increasing circuit, and the pulse width increasing circuit may output a signal obtained by adding a prescribed width to a width of the phase configuration pulse signal to the first DLL circuit to cause the first DLL circuit to perform a converging operation to the region determined.

With this configuration, an initial phase value of the first DLL circuit is further optimized, the convergence time of the first DLL circuit is further advanced in the measurement, and a reduction in the measurement time can be realized while the accuracy is maintained.

In an optical sensor according to a fifth aspect of the present invention referring to the fourth aspect, the first light-receiving unit and the second light-receiving unit include pulse width shaping circuits, each of the pulse width shaping circuits may be configured to shape a corresponding one of a pulse output from the first light-receiving unit and a pulse output from the second light-receiving unit into the prescribed width.

With this configuration, an initial phase value of the first DLL circuit is further optimized, the convergence time of the first DLL circuit is further advanced in the measurement, and a reduction in the measurement time can be realized while the accuracy is maintained.

In an optical sensor according to a sixth aspect of the present invention referring to any one of the first to fifth aspects, the initial configuration circuit may be configured to determine a region in which a counter value is largest by the comparator based on a counter value result by a counter configured to perform counting of the number of pulse outputs from the first light-receiving unit in first to (k/m)th regions obtained by dividing each cycle of the reference clock into (k/m) equal parts, where k/m≥2, m≥2, and k/m and m are integers, and to subsequently determine, based on a counter value result by a counter configured to perform counting of the number of pulse outputs from the first light-receiving unit in first to mth regions obtained by dividing the region in which the counter value is largest into m equal parts, a region in which a counter value is largest by the comparator.

With this configuration, the convergence time of the first DLL circuit is advanced in the measurement, and a reduction in the measurement time can be realized while the accuracy is maintained.

In an optical sensor according to a seventh aspect of the present invention referring to the second aspect, the initial configuration circuit may be configured to determine, during a first half period of the initial phase data acquisition period, a region in which a counter value is largest by the comparator based on a counter value result by a counter for counting the number of pulse outputs from the first light-receiving unit in first to (k/m)th regions obtained by dividing each cycle of the reference clock into (k/m) equal parts, where k/m≥2, m≥2, and k/m and m are integers, and to subsequently determine, during a latter half period of the initial phase data acquisition period, based on a counter value result by a counter for counting the number of pulse outputs from the first light-receiving unit in first to mth regions obtained by dividing the region in which the counter value is largest into m equal parts, a region in which a counter value is largest by the comparator.

With this configuration, the convergence time of the first DLL circuit is advanced in the measurement, and a reduction in the measurement time can be realized while the accuracy is maintained.

In an optical sensor according to an eighth aspect of the present invention referring to the sixth or seventh aspect, the initial configuration circuit may include the counters, wherein the number of the counters corresponds to a larger one of the value of k/m and the value of m when the value of k/m and the value of m are different from each other, or the number of the counters corresponds to any one of the value of k/m and the value of m when the value of k/m and the value of m are the same.

With this configuration, the number of counters included in the initial configuration circuit is reduced, which enables the optical sensor to be downsized.

In an optical sensor according to a ninth aspect of the present invention referring to any one of the first to eighth aspects, the time difference extraction circuit may include the initial configuration circuit.

This configuration enables a time difference extraction circuit including the initial configuration circuit to be realized.

In an optical sensor according to a tenth aspect of the present invention referring to the second aspect, the measurement cycle is preferably repeated a plurality of times.

With this configuration, acquiring initial phase data for each cycle enables the measurement time to be reduced also for the sensing target S which is movable and the distance to which changes for each measurement.

An optical sensor according to an eleventh aspect of the present invention referring to any one of the first to tenth aspects may include a driver circuit configured to drive the light emitting device, and a reference pulse generation circuit configured to supply a reference pulse and to supply the reference clock the same as the reference pulse to the driver circuit.

With this configuration, it is possible to realize an optical sensor including a reference pulse generation circuit configured to supply a reference pulse and to supply the reference clock the same as the reference pulse to the driver circuit.

An electronic device according to a twelfth aspect of the present invention includes the optical sensor according to any one of the first to eleventh aspects.

With this configuration, it is possible to realize an electronic device including an optical sensor configured to reduce a measurement time while the accuracy of the optical sensor is maintained.

The present invention is not limited to the embodiments described above, and various modifications may be made within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

11 FIRST LIGHT-RECEIVING UNIT
12 SECOND LIGHT-RECEIVING UNIT
13 REFERENCE PULSE GENERATION CIRCUIT
14 DRIVER CIRCUIT
15 LIGHT EMITTING DEVICE
16 TIME DIFFERENCE EXTRACTION CIRCUIT
17 FIRST DLL CIRCUIT
18 SECOND DLL CIRCUIT
19 INITIAL CONFIGURATION CIRCUIT
21 PULSE WIDTH SHAPING CIRCUIT
22 PULSE WIDTH SHAPING CIRCUIT
23 PULSE WIDTH SHAPING CIRCUIT
24 PULSE WIDTH SHAPING CIRCUIT
25 PHASE DETECTOR
26 VOLTAGE CONTROL DELAY CIRCUIT
30 PULSE WIDTH INCREASING CIRCUIT
101 OPTICAL SENSOR
202 OPTICAL SENSOR
PD1 PHOTODIODE
R1 ACTIVE QUENCHING. RESISTOR
BUF1 BUFFER
S SENSING TARGET (OBJECT)

The invention claimed is:
1. An optical sensor comprising:
a light emitting device;
a first light-receiving unit of a photon count-type configured to output a pulse synchronous with photon incidence caused by reflected light from a sensing target;
a second light-receiving unit of a photon count-type disposed closer to the light emitting device than the first light-receiving unit is, the second light-receiving unit being configured to output a pulse synchronous with photon incidence caused by reflected light in a sensor package;
a time difference extraction circuit including a first DLL circuit configured to receive a pulse output from the first light-receiving unit and a reference clock and a second DLL circuit configured to receive a pulse output from the second light-receiving unit and the reference clock, the time difference extraction circuit being configured to extract a time difference corresponding to a distance on a spatial optical path; and
an initial configuration circuit configured to give an initial phase value to the first DLL circuit, wherein
the initial configuration circuit includes
  a means for giving an initial phase value of the first DLL circuit within a region including first to nth regions obtained by dividing each of cycles of the reference clock into n equal parts, where n is an integer larger than or equal to 2,
  a counter configured to perform counting of the number of pulse outputs from the first light-receiving unit in the first to nth regions, and
  a comparator for results of the counting,
the initial configuration circuit determines by the comparator, a region in which a counter value is largest among the first to nth regions,
the initial configuration circuit generates a phase configuration pulse signal for setting, as the initial phase value, a phase value corresponding to a case where a center of a received-light waveform of the reflected light received by the first light-receiving unit from the sensing target is located at a center position in the region determined, the initial configuration circuit gives the phase configuration pulse signal to the first DLL circuit, the initial configuration circuit outputs, as the phase configuration pulse signal, a signal cyclically achieving a High voltage in the region in which the counter value is largest to a pulse width increasing circuit, and the pulse width increasing circuit outputs a signal obtained by adding a prescribed width to a width of the phase configuration pulse signal to the first DLL circuit to cause the first DLL circuit to perform a converging operation to the region determined.

2. The optical sensor according to claim 1, wherein
a measurement cycle includes an initial phase data acquisition period, an initial phase convergence period, and an actual measurement period, during the initial phase data acquisition period, the initial configuration circuit determines by the comparator, the region in which the counter value is largest among the first to nth regions, and during the initial phase convergence period, the initial configuration circuit causes the first DLL circuit to perform a converging operation to the region determined.

3. The optical sensor according claim 1, wherein
the initial configuration circuit is configured
    to determine a region in which a counter value is largest by the comparator based on a counter value result by a counter configured to perform counting of the number of pulse outputs from the first light-receiving unit in first to (k/m)th regions obtained by dividing each cycle of the reference clock into (k/m) equal parts, where k/m≥2, m≥2, and k/m and m are integers, and
    to subsequently determine, based on a counter value result by a counter configured to perform counting of the number of pulse outputs from the first light-receiving unit in first to mth regions obtained by dividing the region in which the counter value is largest into m equal parts, a region in which a counter value is largest by the comparator.

4. An electronic device including the optical sensor according to claim 1.

5. An optical sensor comprising:
a light emitting device;
a first light-receiving unit of a photon count-type configured to output a pulse synchronous with photon incidence caused by reflected light from a sensing target;
a second light-receiving unit of a photon count-type disposed closer to the light emitting device than the first light-receiving unit is, the second light-receiving unit being configured to output a pulse synchronous with photon incidence caused by reflected light in a sensor package;
a time difference extraction circuit including a first DLL circuit configured to receive a pulse output from the first light-receiving unit and a reference clock and a second DLL circuit configured to receive a pulse output from the second light-receiving unit and the reference clock, the time difference extraction circuit being configured to extract a time difference corresponding to a distance on a spatial optical path; and an initial configuration circuit configured to give an initial phase value to the first DLL circuit, wherein
the initial configuration circuit includes
    a means for giving an initial phase value of the first DLL circuit within a region including first to nth regions obtained by dividing each of cycles of the reference clock into n equal parts, where n is an integer larger than or equal to 2,
    a counter configured to perform counting of the number of pulse outputs from the first light-receiving unit in the first to nth regions, and
    a comparator for results of the counting,
the initial configuration circuit determines by the comparator, a region in which a counter value is largest among the first to nth regions,
when the initial configuration circuit gives, as the initial phase value, the region determined to the first DLL circuit to cause the first DLL circuit to perform a converging operation, the initial configuration circuit outputs, as a phase configuration pulse signal, a signal cyclically achieving a High voltage in the region in which the counter value is largest to a pulse width increasing circuit, and
the pulse width increasing circuit outputs a signal obtained by adding a prescribed width to a width of the phase configuration pulse signal to the first DLL circuit to cause the first DLL circuit to perform a converging operation to the region determined.

6. The optical sensor according to claim 5, wherein
a measurement cycle includes an initial phase data acquisition period, an initial phase convergence period, and an actual measurement period, during the initial phase data acquisition period, the initial configuration circuit determines by the comparator, the region in which the counter value is largest among the first to nth regions, and during the initial phase convergence period, the initial configuration circuit causes the first DLL circuit to perform a converging operation to the region determined.

7. The optical sensor according claim 5, wherein
the initial configuration circuit is configured
    to determine a region in which a counter value is largest by the comparator based on a counter value result by a counter configured to perform counting of the number of pulse outputs from the first light-receiving unit in first to (k/m)th regions obtained by dividing each cycle of the reference clock into (k/m) equal parts, where k/m≥2, m≥2, and k/m and m are integers, and
    to subsequently determine, based on a counter value result by a counter configured to perform counting of the number of pulse outputs from the first light-receiving unit in first to mth regions obtained by dividing the region in which the counter value is largest into m equal parts, a region in which a counter value is largest by the comparator.

8. An electronic device including the optical sensor according to claim 5.

* * * * *